US012712329B2

(12) United States Patent
Wang

(10) Patent No.: US 12,712,329 B2
(45) Date of Patent: Aug. 18, 2026

(54) STACKABLE DOCKING STATION

(71) Applicant: ACROX TECHNOLOGIES CO., LTD., Taipei City (TW)

(72) Inventor: An-Hsi Wang, Taipei City (TW)

(73) Assignee: ACROX TECHNOLOGIES CO., LTD., Taipei City (TW)

( * ) Notice: Subject to any disclaimer, the term of this patent is extended or adjusted under 35 U.S.C. 154(b) by 280 days.

(21) Appl. No.: 18/514,757

(22) Filed: Nov. 20, 2023

(65) Prior Publication Data

US 2024/0258755 A1 Aug. 1, 2024

(51) Int. Cl.

*G06F 1/16* (2006.01)
*H01R 13/631* (2006.01)
*H01R 33/76* (2006.01)
*H01R 33/94* (2006.01)

(52) U.S. Cl.

CPC ........... *H01R 33/94* (2013.01); *G06F 1/1632* (2013.01); *H01R 13/631* (2013.01); *H01R 33/765* (2013.01)

(58) Field of Classification Search

CPC ..................................................... G06F 1/1632
See application file for complete search history.

(56) References Cited

U.S. PATENT DOCUMENTS 4,501,460 A * 2/1985 Sisler ................... H05K 7/1435 361/732
5,645,434 A * 7/1997 Leung .................. H01R 31/005 439/74
6,059,614 A * 5/2000 Shelby ................ G06F 13/4095 361/744
6,137,686 A * 10/2000 Saye ..................... G06F 1/1632 361/732
6,141,221 A * 10/2000 Tong ........................ H05K 5/30 361/744
6,462,953 B2 * 10/2002 Tong ...................... H01R 25/00 361/728
6,607,408 B2 * 8/2003 Milan ................ G06F 13/4095 361/732
6,698,851 B1 * 3/2004 Ludl ........................ H05K 5/30 312/111
6,839,238 B2 * 1/2005 Derr ..................... H05K 7/1435 361/728

(Continued)

FOREIGN PATENT DOCUMENTS

CN 105608035 A * 5/2016 ................ H02J 7/00

*Primary Examiner* — Adrian S Wilson
(74) *Attorney, Agent, or Firm* — Volpe Koenig

(57) ABSTRACT

The present invention is related to a stacking structure having a docking station and using one of a USB Type-C and a direct current (DC) power supply, including a first stack layer, a first connection member and a second stack layer. The first stack layer has a first connection port including at least two electric power conductors. The first connection member is configured on the first stack layer and has a first engagement portion. The second stack layer has a second connection port and a second engagement portion, wherein the second connection port includes at least two electric power conductors, the second connection port of the second stack layer is used to electrically connect thereto the first connection port of the first stack, and the second engagement portion is used to connect thereto the first engagement portion.

20 Claims, 15 Drawing Sheets

(56) References Cited

U.S. PATENT DOCUMENTS 7,329,152 B2 * 2/2008 Mori ..................... G06F 3/0227 438/928
7,455,543 B2 * 11/2008 Natter .................. H01R 13/639 285/85
7,499,282 B1 * 3/2009 Loucks ................. G06F 1/1656 361/730
7,656,669 B2 * 2/2010 Lee ....................... G06F 1/1601 361/732
7,679,924 B2 * 3/2010 Davis ................... H05K 7/1435 361/741
7,806,723 B2 * 10/2010 Chong ..................... H02G 3/22 439/571
8,385,075 B2 * 2/2013 Loucks ................. G06F 1/1626 361/728
8,953,321 B2 * 2/2015 Knopf ..................... G06F 1/181 361/679.48
9,030,829 B2 * 5/2015 Ma ....................... H05K 5/0086 362/102
9,132,562 B2 * 9/2015 Goh ................... H05K 7/20336
9,335,799 B2 * 5/2016 Nguyen .................. G06F 1/263
9,535,226 B2 * 1/2017 Simmons ............. H01R 13/648
9,710,024 B2 * 7/2017 Kim ........................ G06F 1/181
9,966,717 B2 * 5/2018 Hsu ...................... H01R 31/065
10,028,383 B2 * 7/2018 Park ..................... H01R 12/721
10,049,059 B2 * 8/2018 Rane ..................... G06F 13/102
10,118,574 B2 * 11/2018 Dietrich ............... H01R 13/743
10,153,588 B2 * 12/2018 Lee .......................... H04Q 1/06
10,390,120 B1 * 8/2019 Yang ........................ H05K 5/03
11,751,350 B2 * 9/2023 Sullivan ................ G06F 1/1632 361/679.02
12,366,348 B2 * 7/2025 Ma ............................ F21S 9/02
2003/0007321 A1 * 1/2003 Dayley ................ H05K 7/1435 361/679.6
2007/0177294 A1 * 8/2007 Adachi ................... G06F 1/181 360/55
2008/0235440 A1 * 9/2008 Le ........................... G11C 5/02 365/63
2016/0302320 A1 * 10/2016 Kim ........................ G06F 1/181

* cited by examiner

STACKABLE DOCKING STATION

CROSS-REFERENCE TO RELATED APPLICATION AND CLAIM OF PRIORITY

This application claims the benefit of Taiwan Patent Application No. 112103147, filed with the Taiwan Intellectual Property Office on Jan. 30, 2023, the disclosures of which are incorporated herein in their entirety by reference.

FIELD OF THE INVENTION

The present invention is related to a stackable docking station, particularly a stackable docking station in which a stacked layer having at least two power supply conductors is installed on an extension base by using a connection member.

BACKGROUND OF THE INVENTION

In general, in order to facilitate a notebook to be easily connected to, for example, a display, a device or a wired network, a docking station (Dock, also called an extension base because the known docking station has no additional layers that can be stacked thereon) is used, and in an extension base of the fourth generation (G4), an independent AC power supply is used. At present, in order to directly use the power of a notebook with a USB-C (i.e. USB Type-C) port, the extension base G5 came into being. Although the extension base G5 can be connected to peripheral devices of a computer (such as an electric fan, an air purifier, a desk lamp, an object placement table, a DisplayPort, a network camera and a speaker) through a USB-A port, the size of the desktop is limited. If multiple peripheral devices are placed at the same time, it will appear very messy. Although the known powered base hubs can be placed by stacking, they still rely on the AC power which is irrelevant to transmission signal lines, and thus it is necessary to improve the convenience of use.

Accordingly, in order to overcome the drawbacks in the prior art, the present invention provides a stackable structure and a stackable docking station for convenience of use by which multiple peripheral devices and the extension base can be integrated simultaneously and conveniently.

SUMMARY OF THE INVENTION

In accordance with an aspect of the present invention, a stacking structure using one of a USB Type-C and a direct current (DC) power supply is provided. The stacking structure includes a first stack layer, a first connection member and a second stack layer, wherein the first stack layer has a first connection port including at least two electric power conductors; the first connection member is configured on the first stack layer and has a first engagement portion; and the second stack layer has a second connection port and a second engagement portion, wherein the second connection port includes at least two electric power conductors, the second connection port of the second stack layer is used to electrically connect thereto the first connection port of the first stack, and the second engagement portion is used to connect thereto the first engagement portion. In addition, the first stack layer may be a docking station.

In accordance with a further aspect of the present invention, the present invention provides a stackable docking station using one of a USB Type-C and a direct current (DC) power supply. The stackable docking station includes an extension base, a first connection member and a stack layer. The first connection member includes a first locking plate configured on the extension base and having a first positioning piece; a locking piece configured on the first locking plate, wherein the locking piece has a first surface, a second surface, a central hole and a plurality of engaging media extending from an edge of the central hole, the first surface faces the first locking plate and has a positioning medium, and the first positioning piece is accommodated in the positioning medium so that the locking piece is rotated on the first locking plate; and the second locking plate configured on the second surface of the locking piece and having a second positioning piece and a plurality of engaging pieces, wherein the second positioning piece is accommodated in the central hole so that the locking piece is operable with respect to the second locking plate. In addition, the stack layer is detachably connected to the first connection member and has a plurality of positioning members, each of which has an engagement piece, wherein the plurality of engaging media are accommodated in the plurality of engagement pieces after the plurality of positioning members pass through the plurality of engaging pieces, so that the stack layer is installed on the extension base.

In accordance with an additional aspect of the present invention, the present invention provides a stackable docking station using one of a USB Type-C and a direct current (DC) power supply. The stackable docking station includes a first stack layer, a first connection member and a second stack layer. The first stack layer has a first engagement portion. The first connection member is configured on the first stack layer and has a first connection portion and a second engagement portion, wherein the second engagement portion of the first connection member is engaged with the first engagement portion of the first stack layer. Moreover, the second stack layer has a second connection portion, wherein the second connection portion is engaged with the first connection portion.

BRIEF DESCRIPTION OF THE DRAWINGS

The details and advantages of the present invention will become more readily apparent to one ordinarily skilled in the art after reviewing the following detailed descriptions and accompanying drawings.

DETAILED DESCRIPTION OF THE PREFERRED EMBODIMENT

In order to allow users to use multiple computer peripherals more conveniently, in the present invention, the docking station is made stackable, and thus the docking station not only has extension functions, but also can be combined with multiple computer peripherals. The stackable docking station of the present invention can be stacked conveniently, so that the arrangement of a desktop can not only be used flexibly but also be more tidy and organized.

Figure 1:
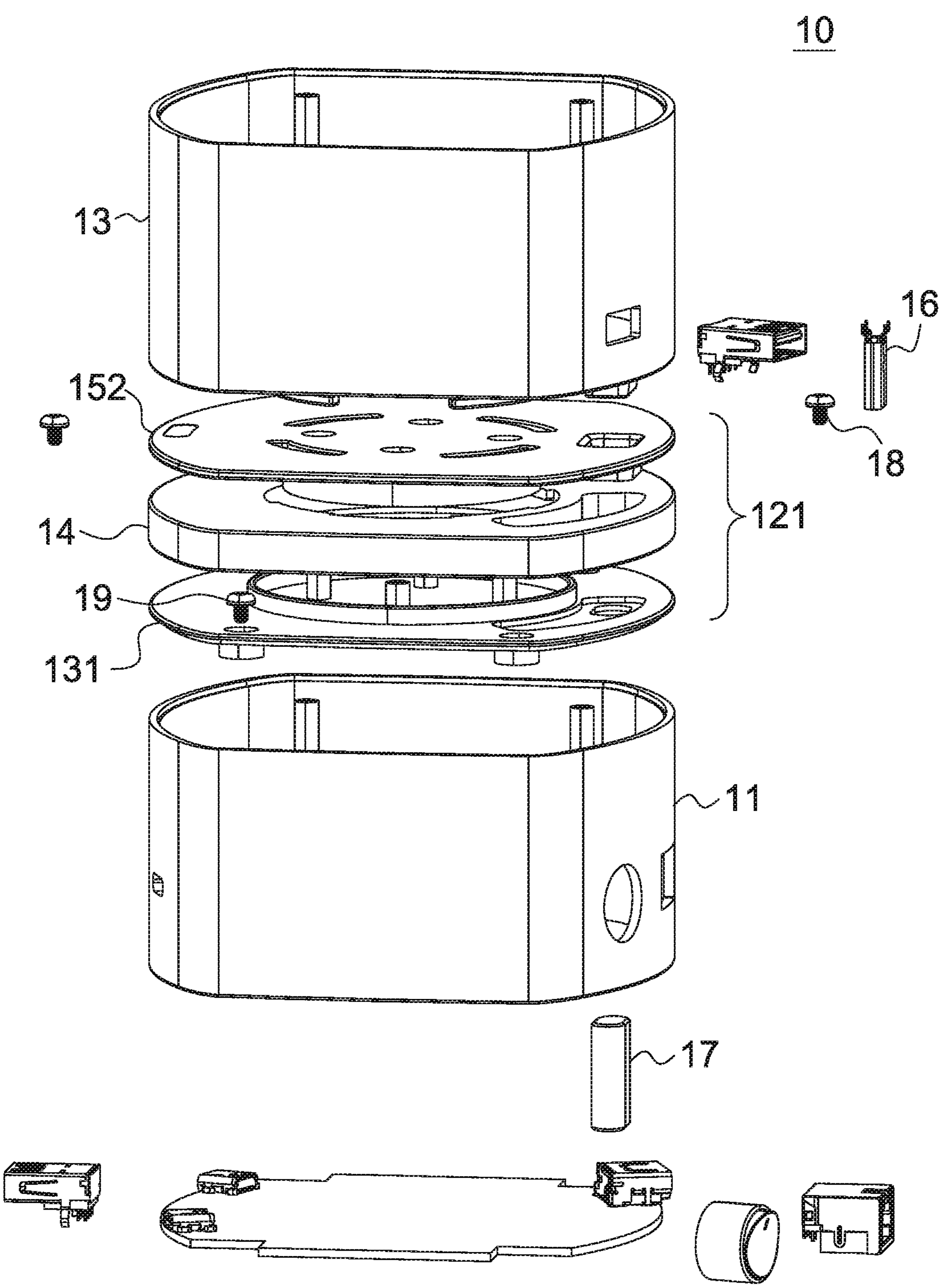
FIG. 1 is an exploded view of a stackable docking station according to the present invention.
Figure 2:
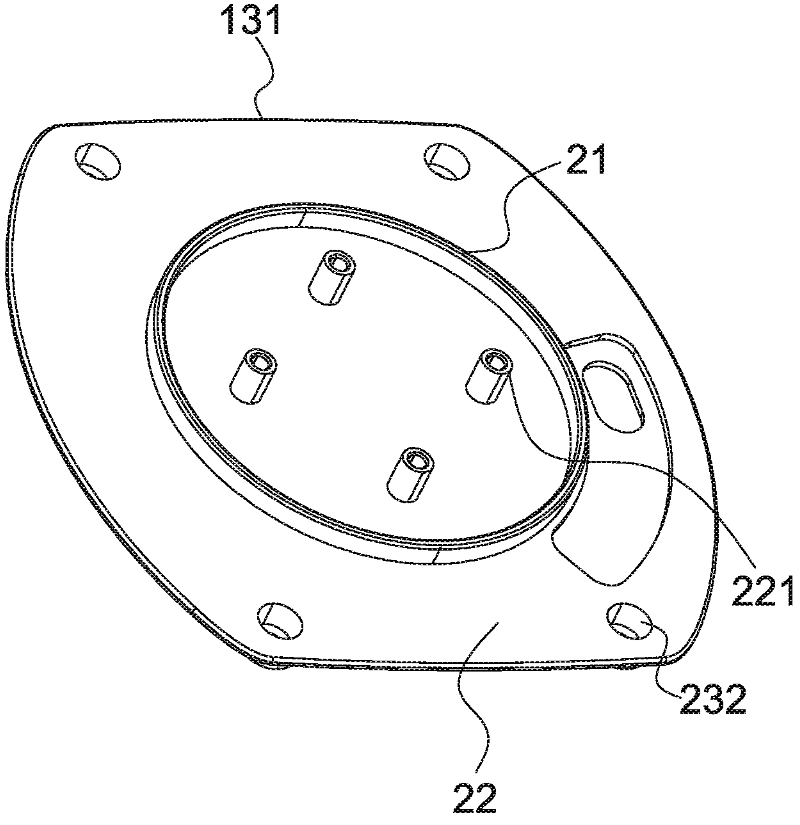
FIG. 2 is a perspective schematic diagram of the first locking plate as shown in FIG. 1.

In a first embodiment of the present invention, as shown in FIG. 1, a stackable docking station 10 is provided. In the stackable docking station 10, a USB Type-C or a direct current (DC) power supply is used. The stackable docking station 10 includes an extension base 11, a first connection member 121 and a stack layer 13, wherein the stack layer 13 is configured on the extension base 11 through the first connection member 121. Hereinafter, the structural details of the stackable docking station 10 will be described by referring to FIGS. 1~12.

As shown in FIG. 1, the first connection member 121 includes a first locking plate 131, a locking piece 14 and a second locking plate 152. The first locking plate 131 is configured on the extension base 11. By referring to FIGS. 2 and 3, the first locking plate 131 has a first positioning piece 21 and four first positioning pillars 221 arranged on a first surface 22 of the first locking plate 131, four second fixing slots 232 and a protrusion portion 122 arranged on a surface (not shown) opposite to the first surface 22. By way of example, the first positioning piece 21 may be a first positioning ring.

Figure 4:
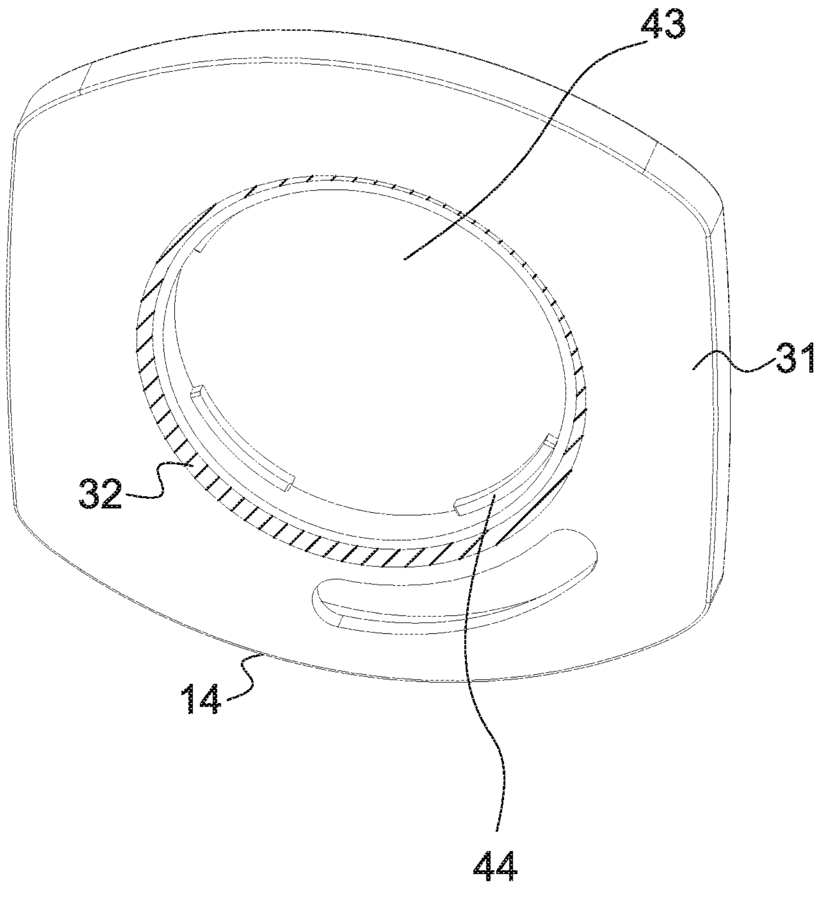
FIG. 4 is a perspective schematic diagram of the locking piece as shown in FIG. 1.
Figure 5:
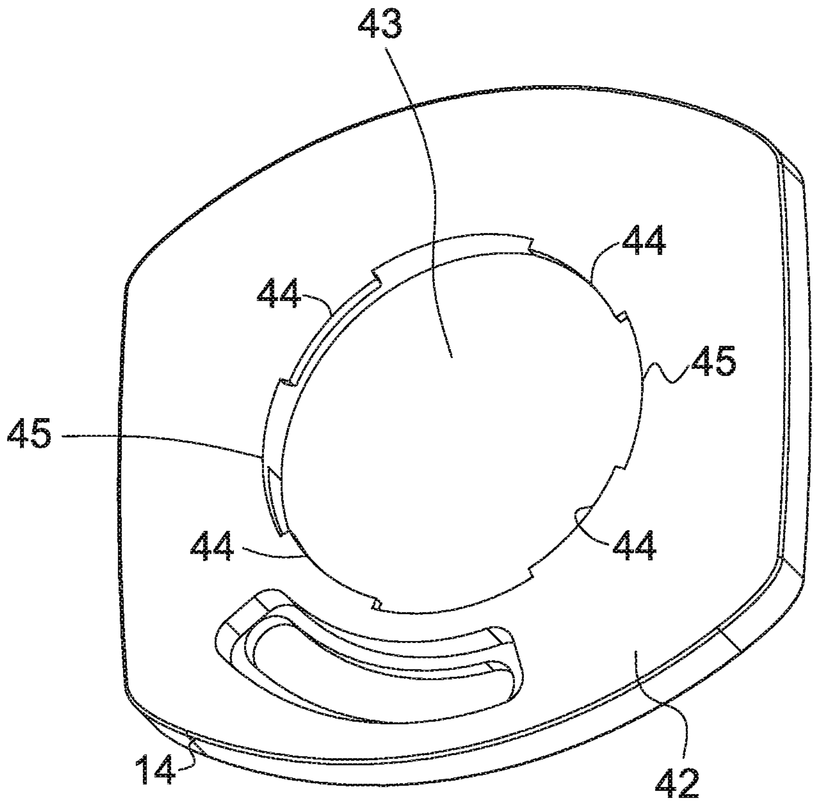
FIG. 5 is another perspective schematic diagram of the locking piece as shown in FIG. 1.
Figure 6:
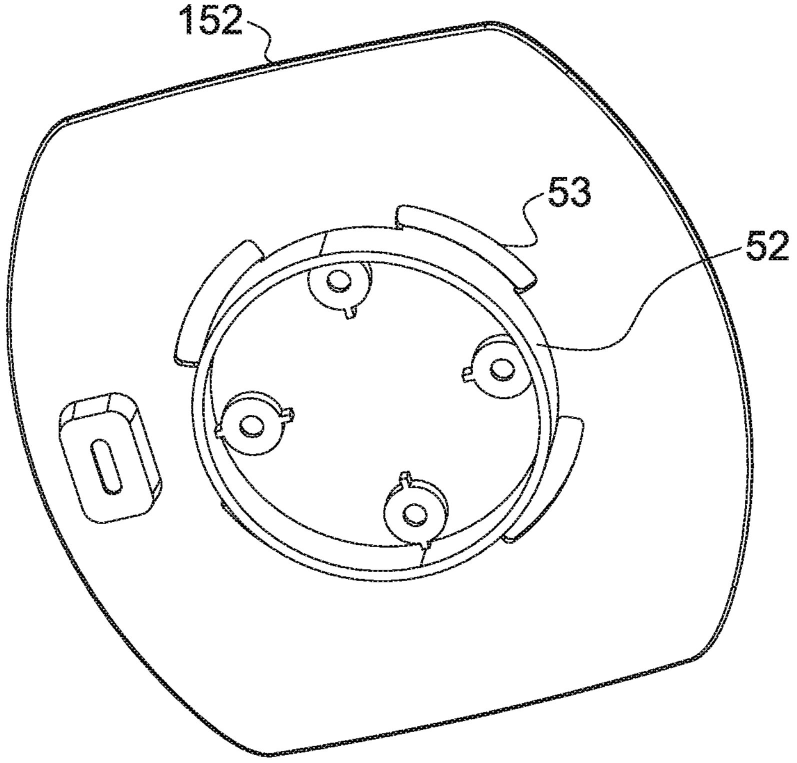
FIG. 6 is a perspective schematic diagram of the second locking plate as shown in FIG. 1.

By referring to FIGS. 1, 4 and 5, the locking piece 14 is arranged on the first locking plate 131, and has a first surface 31, a second surface 42, a central hole 43, four engaging media 44 extending from an edge of the central hole 43 and a receiving slot 45 between every adjacent two of the four engaging media 44. The first surface 31 of the locking piece 14 faces the first surface 22 of the first locking plate 131 and has a positioning medium 32. The first positioning piece 21 of the first locking plate 131 is accommodated in the positioning medium 32 of the locking piece 14 so that the locking piece 14 may be rotated on the first locking plate 131. By way of example, a locking ring may be used as the locking piece 14; tenons may be used as the engaging media 44; and a positioning slot may be used as the positioning medium 32.

As shown in FIG. 1, the second locking plate 152 is configured on the second surface 42 of the locking piece 14. By referring to FIGS. 6 and 7, the second locking plate 152 has a second positioning piece 52, four engaging pieces 53, four first fixing slots 71 and an opening 72. By referring to FIGS. 1, 5 and 6, the second positioning piece 52 of the second locking plate 152 is accommodated in the central hole 43 of the locking piece 14 so that the locking piece 14 is operable with respect to the second locking plate 152. For example, by accommodating the second positioning piece 52 of the second locking plate 152 in the central hole 43 of the locking piece 14, the locking piece 14 can be rotated with respect to the second locking plate 152. By way of example, a second positioning ring may serve as the second positioning piece 52, and perforations may serve as the engaging pieces 53.

Figure 8:
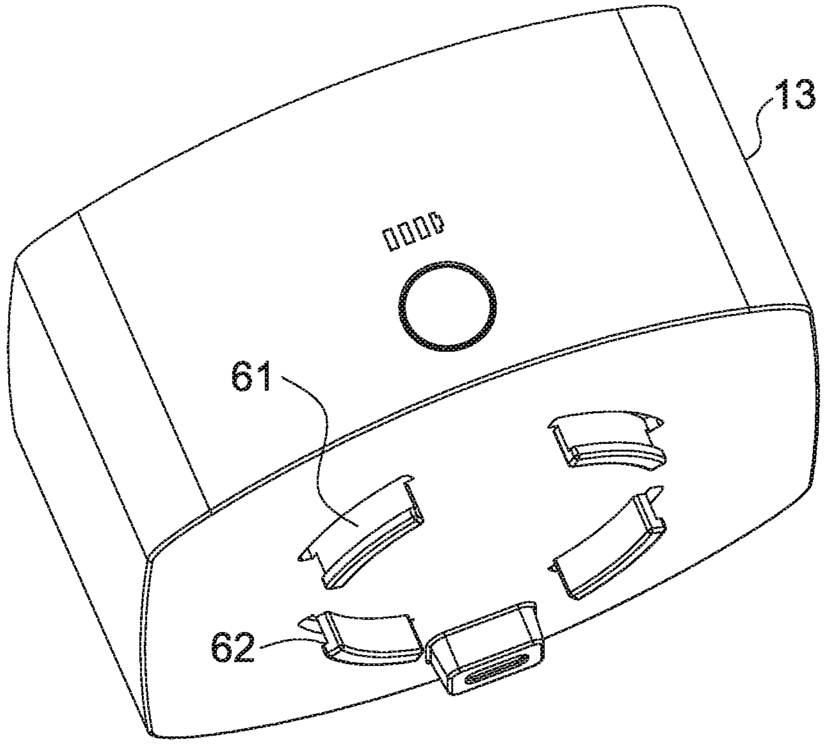
FIG. 8 is a perspective schematic diagram of the stack layer as shown in FIG. 1.
Figure 9:
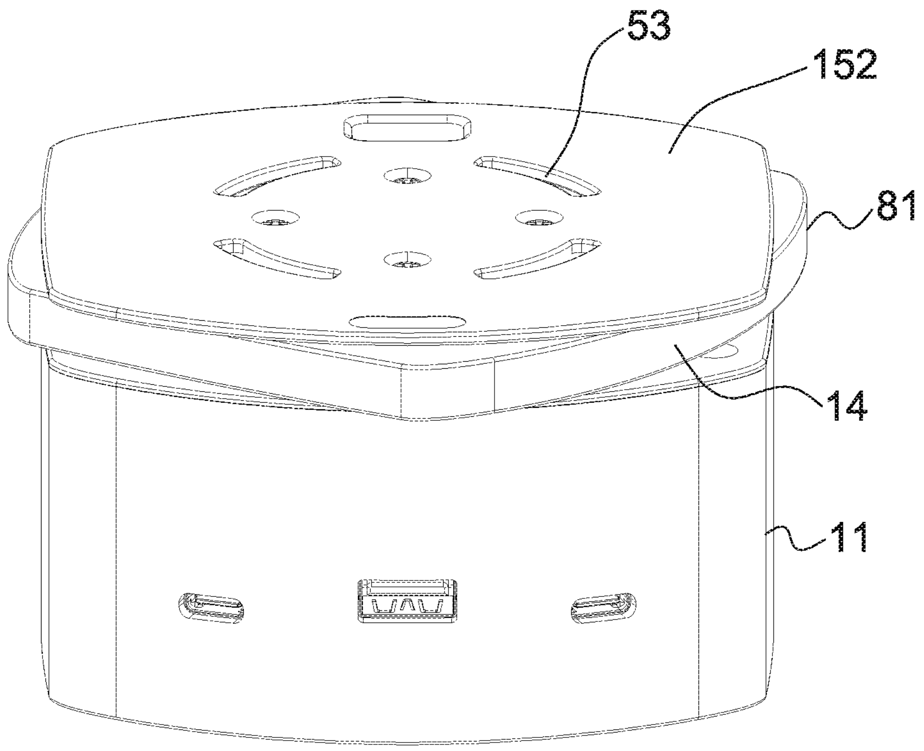
FIG. 9 is a perspective schematic diagram of the locking piece on an unlocking position.
Figure 10:
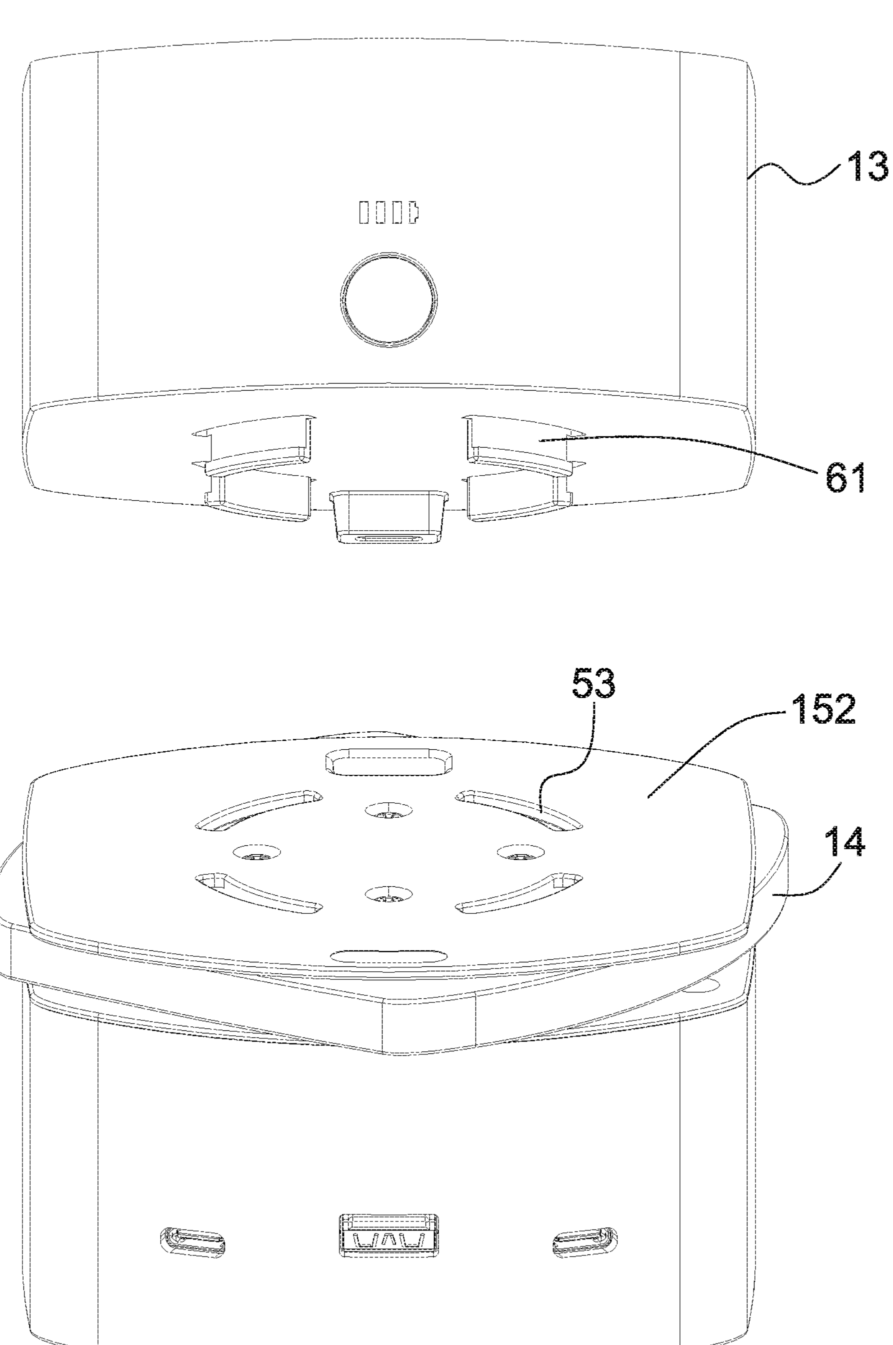
FIG. 10 is a perspective schematic diagram of the stacking layer and the extension base as shown in FIG. 1 before stacking.
Figure 11:
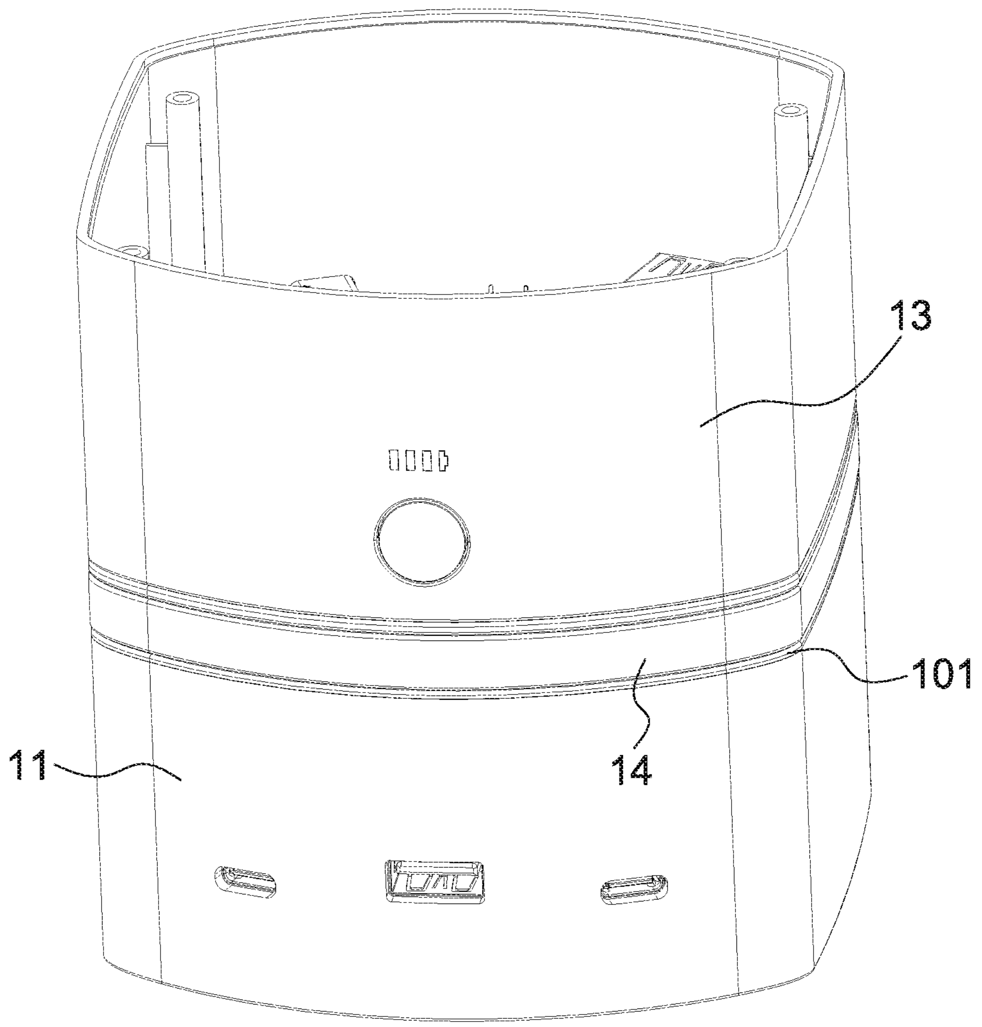
FIG. 11 is a perspective schematic diagram of the locking piece on a locking position.

FIG. 8 is a perspective schematic diagram of the stack layer 13. The stack layer 13 is detachably connected to the first connection member 121. The stack layer 13 has four positioning members 61, each positioning member 61 has an engagement piece 62, wherein each of the four engaging media 44 of the locking piece 14 is accommodated in a respective one of the four engagement pieces 62 after each of the four positioning members 61 passes through a respective one of four engaging pieces 53, so that the stack layer 13 is arranged on the extension base 11 through the first connection member 121. By way of example, the positioning plates may serve as the positioning members 61, and the engagement slot may serve as the engagement pieces 62.

Figure 7:
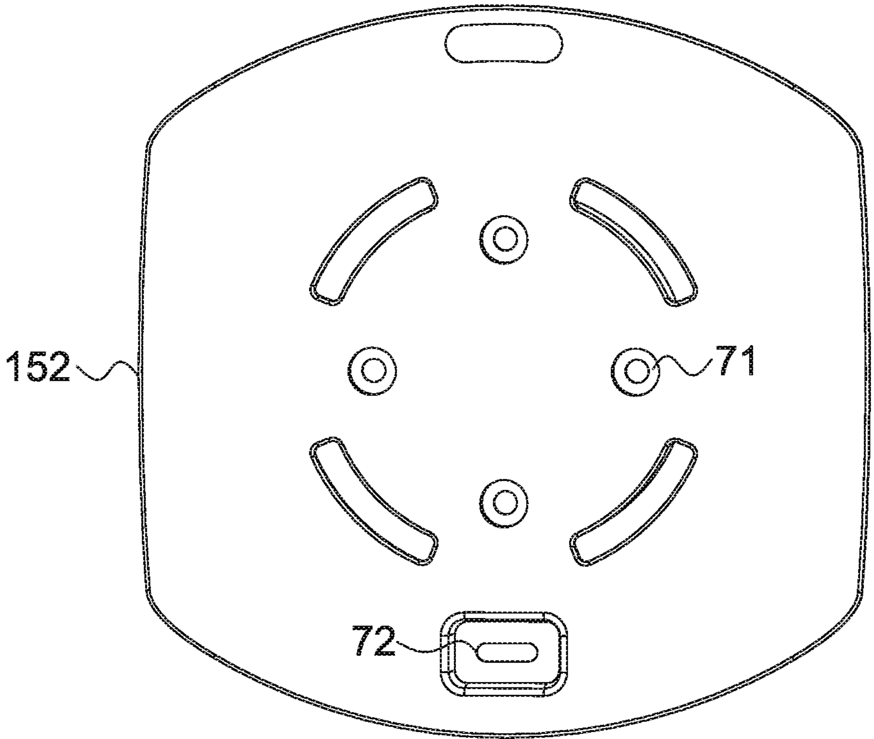
FIG. 7 is a schematic diagram of the second locking plate as shown in FIG. 1.
Figure 14:
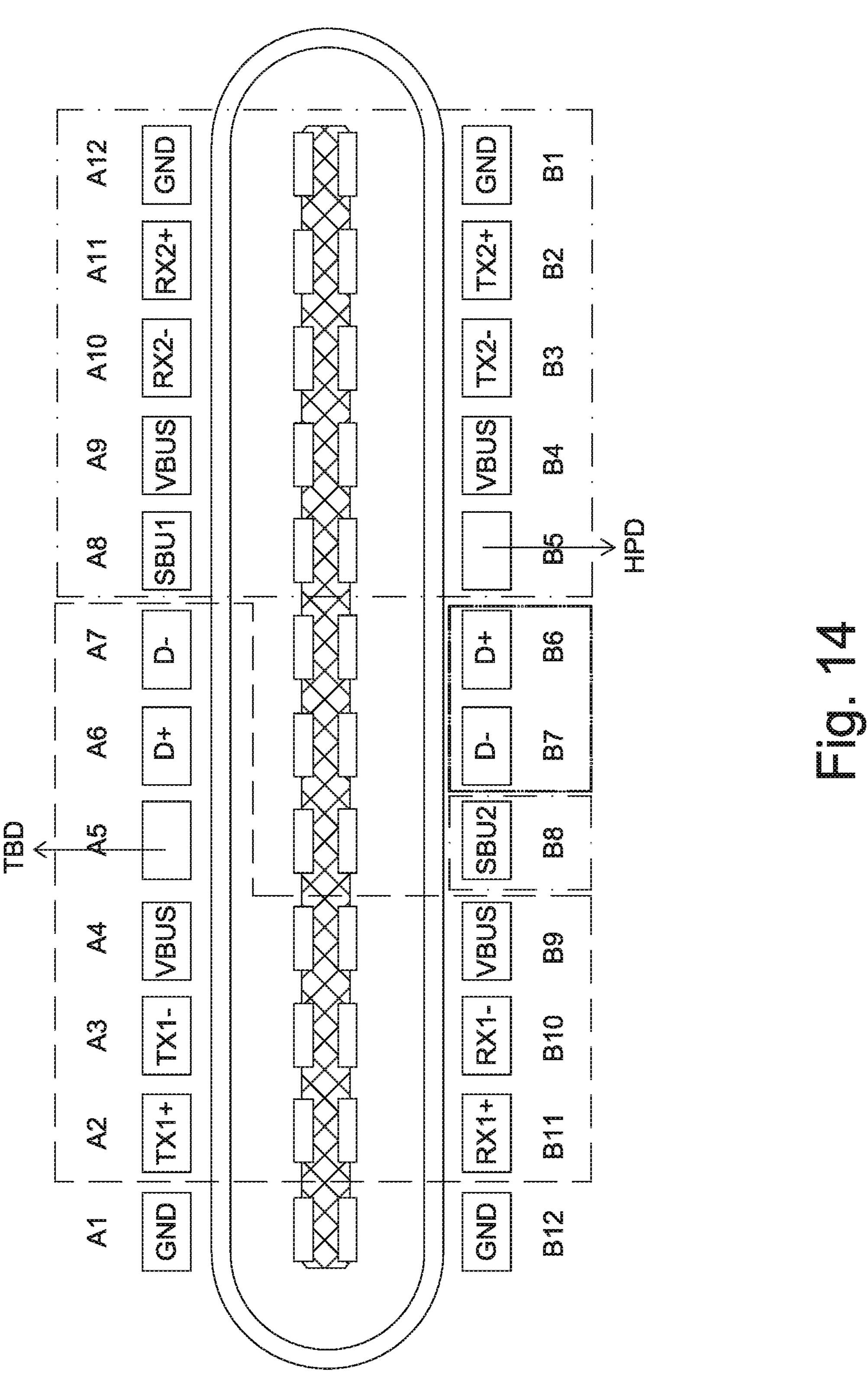
FIG. 14 is an exemplified schematic diagram of the pin layout of the USB-C socket as shown in FIG. 1.

By referring to FIGS. 1, 7 and 8, the stack layer 13 has a USB-C plug 16 and the extension base 11 has a USB-C socket 17, wherein the USB-C plug 16 of the stack layer 13 is electrically connected to the USB-C socket 17 of the extension base 11, and the USB-C socket 17 of the extension base 11 is arranged in the opening 72 of the second locking plate 152. The USB-C socket 17 includes an A5 pin and a B5 pin, wherein the A5 pin is a Track-Before-Detect (TBD) pin, and the B5 pin is a Hot-Plug Detect (HPD) pin so that the USB-socket 17 within the stackable docking station 10 is formed like a closed circuit system in which the pins may be self-defined (as shown in FIG. 14). The stackable docking station 10 can be electrically connected to electronic devices generally having USB-C, such as notebooks, desktop computers, mobile devices and game consoles. The stackable docking station 10 may be electrically connected to electronic devices (for example, a notebook computer, a desktop computer, a mobile devices or a game console) having a common USB-C.

As described above, the first locking plate 131 has four first positioning pillars 221 arranged on a first surface 22 of the first locking plate 131, and the second locking plate 152 has four first fixing slots 71. By referring FIGS. 1, 2 and 7, each of the four first fixing slots 71 of the second locking plate 152 is locked on the respective one of the four positioning pillars 221 of the first locking plate 131 by a screw 18.

The locking piece 14 has a receiving slot 45 between every adjacent two of the four engaging media 44. That is, in the first embodiment, the locking piece 14 has four receiving slots 45. As described above, the second locking plate 152 may be configured on the locking piece 14 by accommodating the second positioning piece 52 of the second locking plate 152 in the central hole 43 of the locking piece 14, and the locking piece 14 may be rotated with respect to the second locking plate 152 clockwise or counterclockwise. By referring to FIGS. 5, 6, 8 and 9, when the locking piece 14 is rotated to an unlocking position 81, the four receiving slots 45 of the locking piece 14 align the four engaging pieces 53 of the second positioning plate 152 for the four positioning members 61 of the stack layer 13 passing therethrough. By referring to FIG. 10, when configuring the stack layer 13 on the second locking plate 152, the locking piece 14 is first rotated to the unlocking position 81, and then the four positioning members 61 of the stack layer 13 may pass through the aligned four receiving slots 45 and four engaging pieces 53. After that, by referring to FIGS. 5, 8 and 11, the locking piece 14 may be rotated clockwise or counterclockwise to a locking position 101 so that the four engaging media 44 of the locking piece 14 are rotated into the four engagement pieces 62 of the stack layer 13, whereby the stack layer 13 is installed on the extension base 11.

Figure 3:
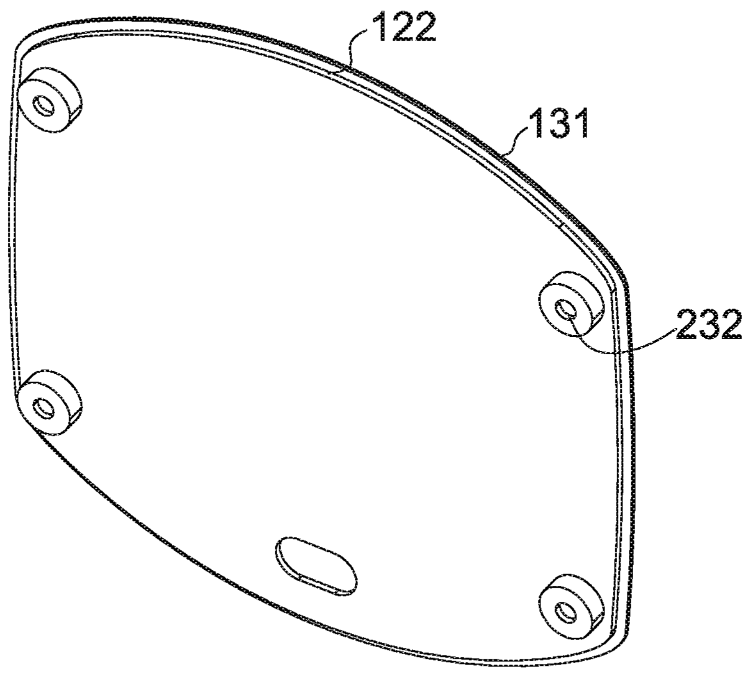
FIG. 3 is another perspective schematic diagram of the first locking plate as shown in FIG. 1.
Figure 12:
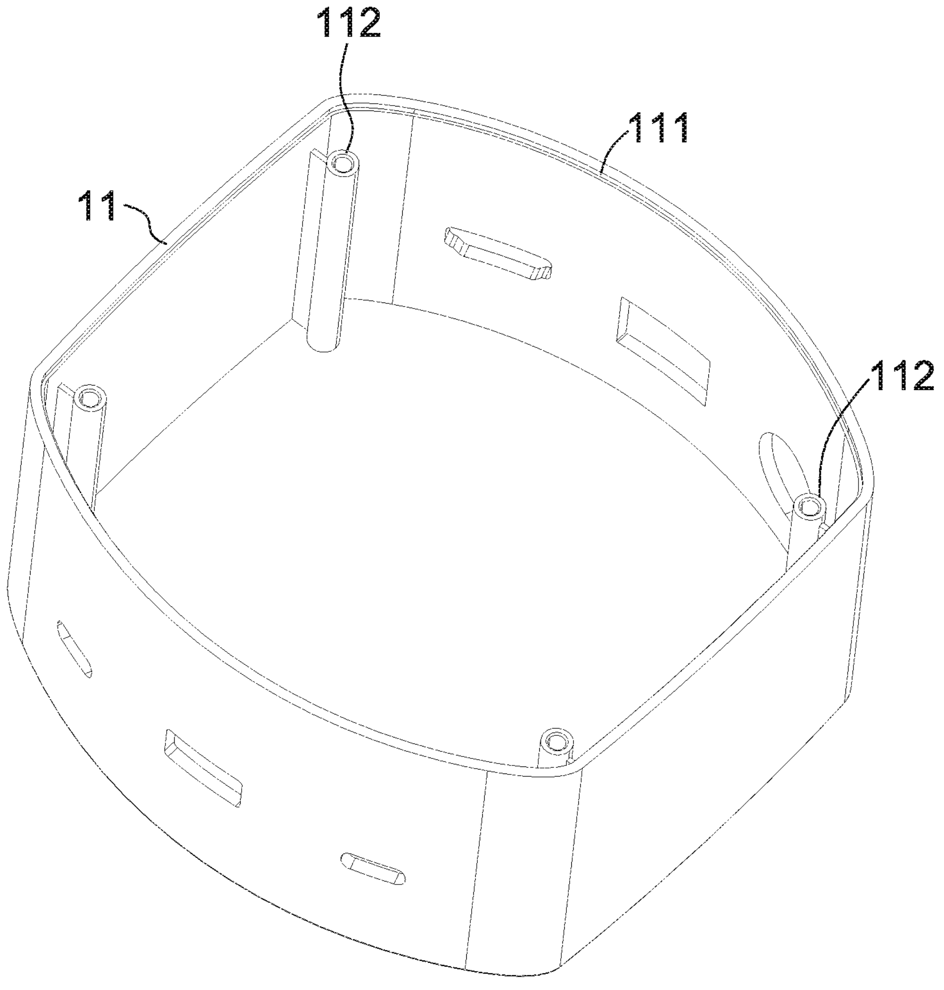
FIG. 12 is a perspective schematic diagram of the extension base as shown in FIG. 1.

By referring to FIGS. 1, 3 and 12, the extension base 11 has a concave portion 111 and four second positioning pillars 112, and the first locking plate 131 of the first connection member 121 has a protrusion portion 122 and four second fixing slots 232. The protrusion portion 122 of the first locking plate 131 is inserted into the concave portion 111 of the extension base 11. Each of the four second fixing slots 232 of the first locking plate 131 is fixed on a respective one of the four second positioning pillars 112 of the extension base 11 by a screw 19.

In the first embodiment, the extension base 11 and the stack layer 13 may be regarded as stack layers.

The stack layer 13 may include at least one of a DisplayPort, a network camera, a speaker, an electric fan, an air purifier, a table lamp, an uninterruptible power system and a storage table (not shown).

Based on the inventive concept in the present invention, in the first embodiment, it is flexible to increase the numbers of stack layers of the stackable docking station as needed. That is, in addition to the basic structure, including the extension base 11, the first connection member 121 and the stack layer 13, of the stackable docking station 10, as described with reference to FIGS. 1 to 12, one or more additional stack layers may be sequentially stacked above the stack layer 13 through additional connection members with every two adjacent stack layers being connected to each other through a respective connection member.

Figure 13:
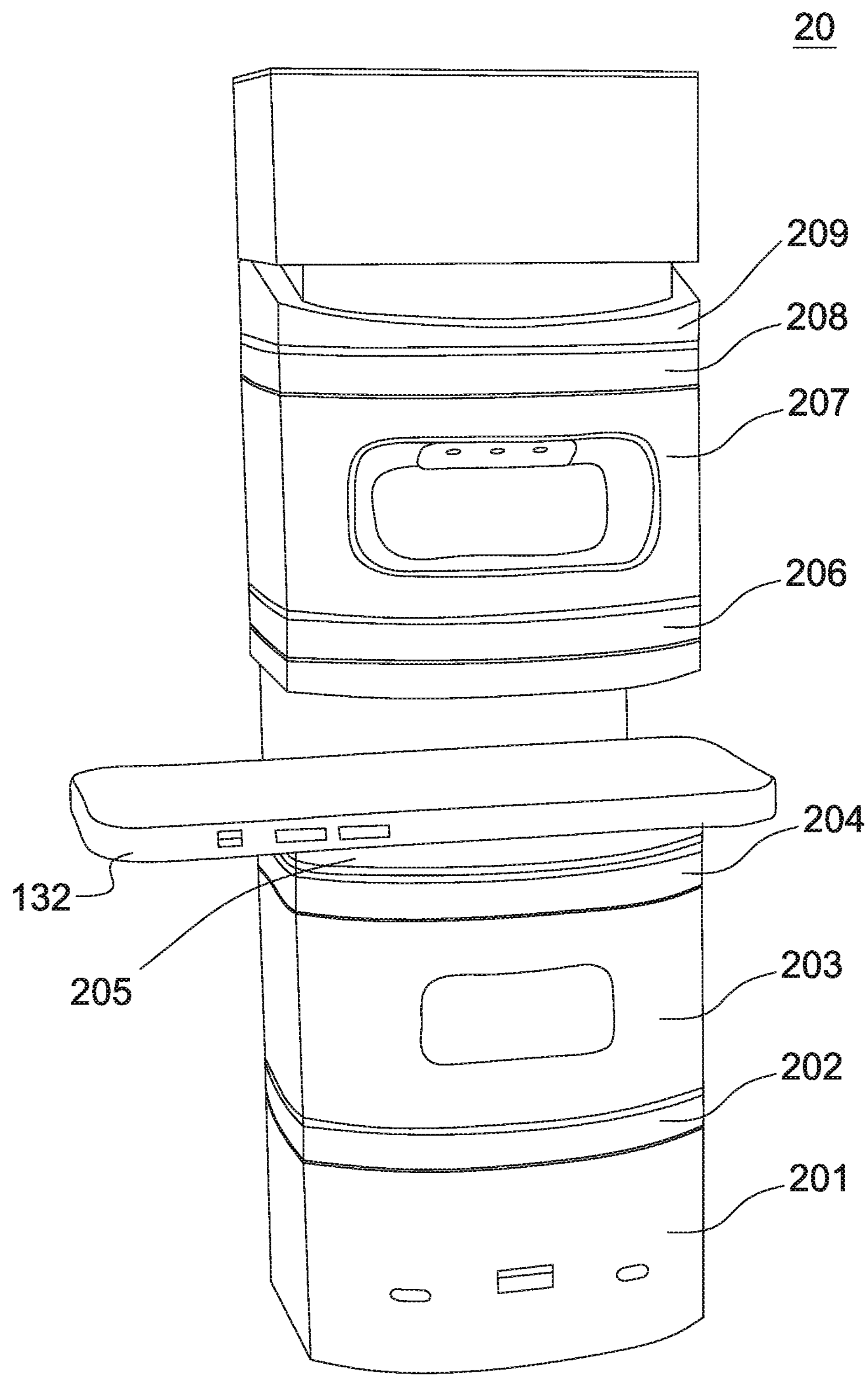
FIG. 13 is a perspective schematic diagram of a stackable docking station according to the present invention.

In a second embodiment, as shown in FIG. 13, a stackable docking station 20 is provided. In the stackable docking station 20, a USB Type-C or a direct current (DC) power supply is used. The stackable docking station 20 includes a first stack layer 201, a first connection member 202, a second stack layer 203, a second connection member 204, a third stack layer 205, a third connection member 206, a fourth stack layer 207, a fourth connection member 208 and a fifth stack layer 209. The second stack layer 203 is stacked on the first stack layer 201 through the first connection member 202, the third stack layer 205 is stacked on the second stack layer 203 through the second connection member 204, the fourth stack layer 207 is stacked on the third stack layer 205 through the third connection member 206, and the fifth stack layer 209 is stacked on the fourth stack layer 207 through the fourth connection member 208.

The structure of each of the first connection member 202, the second connection member 204, the third connection member 206 and the fourth connection member 208 is the same as that of the first connection member 121 in the first embodiment, and the method for connecting two adjacent stack layers through the connection member is similar to that for connecting the extension base 11 to the stack layer 13 through the first connection member 121 in the first embodiment as described above.

Figure 15:
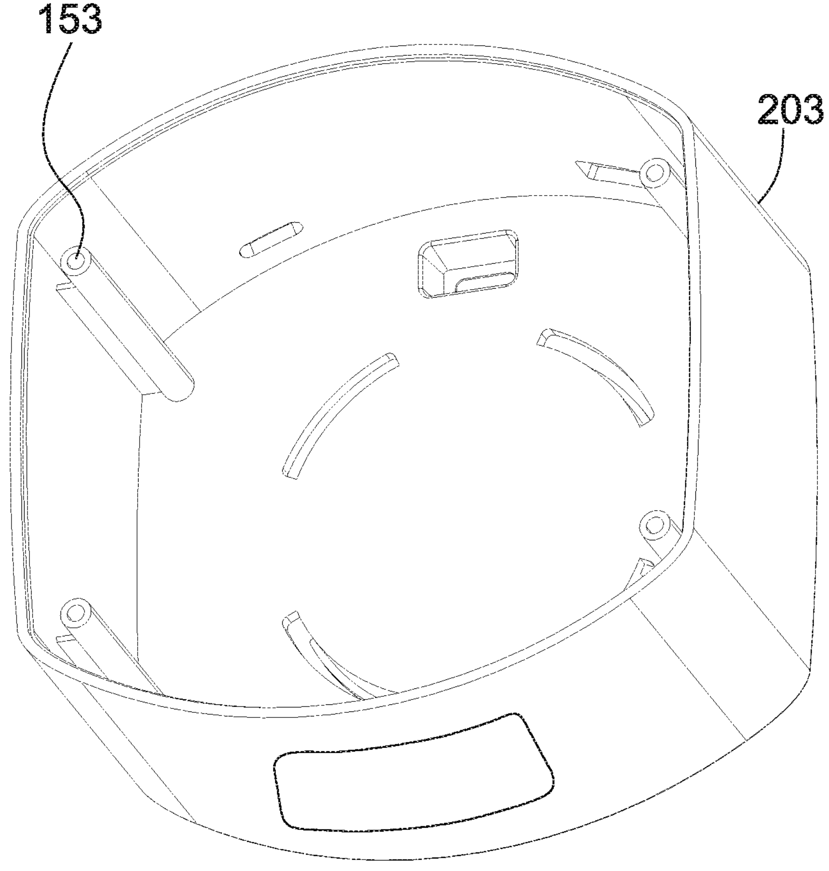
FIG. 15 is a perspective schematic diagram of the second stack layer.

The connection structure of the first stack layer 201 to the first connection member 202 is the same as that of the extension base 11 to the first connection member 121 in the first embodiment with reference to FIGS. 1 to 12 as described above. To sequentially stack the third stack layer 205, the fourth stack layer 207 and the fifth stack layer 209 above the second stack layer 203, in addition to the connection structure of the second stack layer 203 the same as that of the stack layer 13 to the extension base 11 in the first embodiment, the second stack layer 203 further includes four third positioning pillars 153 (as shown in FIG. 15) for fixing thereto the second connection member 204 by screws (not shown), similar to the fixing of the second fixing slots 232 of the first locking plate 131 to the second positioning pillar 112 of the extension base 11 by a screw 19 in the first embodiment. The connection structure of each of the third stack layer 205, the fourth stack layer 207 and the fifth stack layer 209 is the same as that of the second stack layer 203 as described above.

Each stack layer may include at least one of a DisplayPort, a network camera, a speaker, an electric fan, an air purifier, a table lamp, an uninterruptible power system (UPS) and a storage table. Power can be delivered from the UPS to any other stack layers when there is a power failure. For example, as shown in FIG. 13, the third stack layer 205 is embodied as a storage table on which a cellular phone 132 may be put.

In each of the embodiments as described above, the second stack layer has an independent use when separated from the first stack layer. By way of example, when the second stack layer including an uninterruptible power system is separated from the first stack layer, the uninterruptible power system may serve as a mobile power supply/power bank, which can charge the objects that need to be charged.

In a third embodiment of the present invention, referring to FIGS. 1 to 14, a stacking structure is provided. In the stacking structure, a USB Type-C or a direct current (DC) power supply is used. The stacking structure includes a first stack layer, which may be referred to as a docking station, a first connection member and a second stack layer, wherein the second stack layer is stacked on the first stack layer via the first connection member. By referring to FIGS. 1 to 12, the stackable docking station 10 may serve as the stacking structure, the extension base 11 may serve as the first stack layer, the first connection member 121 may serve as the first connection member in the stacking structure, and the stack layer 13 may serve as the second stack layer in the stacking structure. The first connection member has a first connection port. The USB-C socket 17 as shown in FIG. 1 may serve as the first connection port. The first connection port of the first stack layer in the stacking structure includes a pinout of four electric power conductors A4, A9, B4, B9, as shown in FIG. 14. In the stacking structure, the first connection member is configured on the first stack and has a first engagement portion. The engaging media 44 as shown in FIGS. 4 and 5 may serve as the first engagement portion in the stacking structure. The second stack layer has a second connection port and a second engagement portion. The USB-C plug 16 as shown in FIG. 1 may serve as the second connection port. The engagement piece 62 as shown in FIG. 8 may serve as the second engagement portion. The second connection port includes four electric power conductors (not shown), the second connection port of the second stack layer is used to electrically connect thereto the first connection port of the first stack, and the second engagement portion is used to connect thereto the first engagement portion.

An example of the pin layout of the USB-C socket 17 is shown in FIG. 14, wherein the pins A2~A7 and B9~B11 grouped by dashed lines are for a network camera, and the pins A8~A12, B1~B5 and B8 grouped by thin dot-and-dash lines are for DP signals, and pins B6 and B7 grouped by thick dot-and-dash lines are for speakers.

In a fourth embodiment of the present invention, referring to FIGS. 1 to 14, a stackable docking station 10 is provided. In the stackable docking station 10, a USB Type-C or a direct current (DC) power supply is used. The stackable docking station 10 includes a first stack layer, a first connection member and a second stack layer, wherein the second stack layer is stacked on the first stack layer via the first connection member. By referring to FIGS. 1 to 12, the stackable docking station 10 may serve as the stackable docking station in the fourth embodiment, the extension base 11 may serve as the first stack layer, the first connection member 121 may serve as the first connection member in the fourth embodiment, and the stack layer 13 may serve as the second stack layer in the fourth embodiment. The first stack layer has a first engagement portion, and the first connection member is configured on the first stack layer and has a first connection portion and a second engagement portion. The second stack layer has a second connection portion, and the second connection portion is engaged with the first connection portion. By referring to FIGS. 1 to 12, the concave portion 111 may serve as the first engagement portion, the engaging media 44 may serve as the first connection portion, the protrusion portion 122 may serve as the second engagement portion and the engagement piece 62 may serve as the second connection portion.

In the fourth embodiment, the second stack layer, in which a UPS system, for example, is included, of the stackable docking station 10 may additionally have a common USB-C port (not shown) through which the second stack layer may be directly connected to an electronic device when being used separately from the first stack layer. That is, when separated from the first stack layer, the second stack layer having the common USB-C port may be connected to an external electronic device via the common USB-C port and thus may be charged by the external electronic device through the common USB-C port. Accordingly, the second stack layer does not have to be charged by the first stack layer.

In the embodiments of the present invention, the communication interfaces among different stack layers are connected by the 24-pin connector of USB-C. The 24-pin connector of USB-C begins with the first stack layer, i.e. the extension base 11. In the present invention, the signal sources are programmed by grouping the pins. Pins for each stack layer may be designated based on power or signals as needed. By way of examples, a first group of pins from 24 pins of the 24-pin connector of USB-C may be designated for a display port (including Vbus/Gnd and 2-lane signals, AUX1/AUX2 and HPD); a second group of pins from 24 pins of the 24-pin connector of USB-C may be designated for a network camera (including Vbus/Gnd and signals that support up to resolution of 4K); and a third group of pins from 24 pins of the 24-pin USB-C connector may be designated for speaker signals (including D+/D−1). For example, when a network camera is included in a certain stack layer, the internal lines of the stack layer must follow the programmed design so as to obtain power from specified pins; and return images obtained by the camera lens through specified pins.

Because the stacking direction of the stack layers is fixed, it is not necessary to consider the need for positive/reverse insertion for the socket between the stack layers. In the present invention, it is not necessary to do a symmetrical arrangement for pins. That is, although standard USB-C cables and connectors are used in the present invention, the USB-socket within the stackable docking station 10 is like a closed circuit system in which the pins may be self-defined, for example, the A5 pin is defined as a Track-Before-Detect (TBD) pin and a B5 pin is defined as a Hot-Plug Detect (HPD) pin, as described above, and the connection of an USB-C plug which is connected to the extension base to the USB-C socket on the host of a notebook computer is still a standard Type-C connection type.

In view of the above, the present invention provides a brand-new stacking structure wherein multiple computer peripheral devices may be stacked on the extension base and stack layers which each has at least two electric power conductors that may be stacked on the extension base by connection members.

It is expected that modifications and combinations will readily occur to one ordinarily skilled in the art, and these modifications and combinations are within the scope of this invention.

The invention claimed is:

1. A stacking structure using one of a USB Type-C and a direct current (DC) power supply, comprising:

a first stack layer having a first connection port including at least two electric power conductors;

a first connection member configured on the first stack layer and having a first engagement portion, wherein the first connection member comprises:

a first locking plate configured on the first stack layer and having a first positioning piece; and a locking piece configured on the first locking plate, wherein the locking piece has a first surface, a second surface, a central hole and a plurality of engaging media extending from an edge of the central hole, the first surface faces the first locking plate and has a positioning medium, and the first positioning piece is accommodated in the positioning medium so that the locking piece is rotated on the first locking plate; and a second stack layer having a second connection port and a second engagement portion, wherein the second connection port includes at least two electric power conductors, the second connection port of the second stack layer is used to electrically connect thereto the first connection port of the first stack, and the second engagement portion is used to connect thereto the first engagement portion.

2. The stacking structure according to claim 1, further comprising a second connection member and a third stack layer, wherein the third stack is stacked on the second stack layer through the second connection member.

3. The stacking structure according to claim 2, wherein the second stack layer has a plurality of third positioning pillars for locking the second connection member.

4. The stacking structure according to claim 2, wherein the second stack layer or the third stack layer is a DisplayPort, a network camera, a speaker, an electric fan, an air purifier, a table lamp, an uninterruptible power system (UPS), or a storage table.

5. The stacking structure according to claim 1, wherein the second stack layer has an independent use when separated from the first stack layer; and the first stack layer is a docking station.

6. A stackable docking station using one of a USB Type-C and a direct current (DC) power supply, comprising:

an extension base;

a first connection member, comprising:

a first locking plate configured on the extension base and having a first positioning piece;

a locking piece configured on the first locking plate, wherein the locking piece has a first surface, a second surface, a central hole and a plurality of engaging media extending from an edge of the central hole, the first surface faces the first locking plate and has a positioning medium, and the first positioning piece is accommodated in the positioning medium so that the locking piece is rotated on the first locking plate; and a second locking plate configured on the second surface of the locking piece and having a second positioning piece and a plurality of engaging pieces, wherein the second positioning piece is accommodated in the central hole so that the locking piece is operable with respect to the second locking plate; and a stack layer detachably connected to the first connection member and having a plurality of positioning members, each of which has an engagement piece, wherein the plurality of engaging media are accommodated in the plurality of engaging pieces after the plurality of positioning members pass through the plurality of engaging pieces, so that the stack layer is installed on the extension base.

7. The stackable docking station according to claim 6, wherein the stack layer has a USB-C plug, and the extension base has a USB-C socket, wherein the USB-C plug of the stack layer is electrically connected to the USB-C socket of the extension base, and the second locking plate has an opening for installing the USB-C socket of the extension base.

8. The stackable docking station according to claim 7, wherein the stack layer includes at least one of a DisplayPort, a network camera, a speaker, an electric fan, an air purifier, a table lamp, an uninterruptible power system and a storage table.

9. The stackable docking station according to claim 8, wherein the USB-C socket includes an A5 pin and a B5 pin, wherein the A5 pin is a Track-Before-Detect (TBD) pin, and the B5 pin is a Hot-Plug Detect (HPD) pin.

10. The stackable docking station according to claim 6, wherein the first locking plate has a plurality of first positioning pillars, the second locking plate has a plurality of first fixing slots, and the plurality of first fixing slots of the second locking plate are fixed on the plurality of first positioning pillars of the first locking plate by a plurality of screws.

11. The stackable docking station according to claim 6, wherein the extension base has a concave portion and a plurality of second positioning pillars, and the first locking plate of the first connection member has a protrusion portion and a plurality of second fixing slots, and the protrusion portion of the first locking plate is inserted into the concave portion of the extension base.

12. The stackable docking station according to claim 11, wherein the plurality of second fixing slots of the first locking plate are fixed on the plurality of second positioning pillars of the extension base by a plurality of screws.

13. The stackable docking station according to claim 6, wherein the locking piece has a receiving slot between every adjacent two of the plurality of engaging media of the locking piece.

14. The stackable docking station according to claim 13, wherein when the locking piece is rotated to an unlocking position, the plurality of receiving slots align the plurality of engaging pieces for the plurality of positioning members of the stack layer passing therethrough.

15. The stackable docking station according to claim 13, wherein the locking piece is rotated to a locking position after the plurality of positioning members of the stack layer passing through the plurality of engaging pieces and the plurality of receiving slots so that the plurality of engaging media of the locking piece are rotated into the plurality of engagement pieces of the stack layer, whereby the stack layer is installed on the extension base.

16. The stackable docking station according to claim 6, wherein the first positioning piece is a first positioning ring, the second positioning piece is a second positioning ring, the plurality of engaging media are a plurality of tenons, the positioning medium is a positioning slot, the plurality of engaging pieces are a plurality of perforations, and the plurality of positioning members are a plurality of positioning plates.

17. The stackable docking station according to claim 6, wherein the second positioning piece is accommodated in the central hole so that the locking piece is rotated with respect to the second locking plate.

18. A stackable docking station using one of a USB Type-C and a direct current (DC) power supply, comprising:

a first stack layer having a first engagement portion;

a first connection member configured on the first stack layer and having a first connection portion and a second engagement portion, wherein the second engagement portion of the first connection member is engaged with the first engagement portion of the first stack layer, and the first connection member further comprises:

a first locking plate configured on the first stack layer and having a first positioning piece; and a locking piece configured on the first locking plate, the locking piece having a first surface facing the first locking plate, a positioning medium on the first surface, and a plurality of engaging media, the first positioning piece being accommodated in the positioning medium so that the locking piece is rotatable on the first locking plate; and a second stack layer having a second connection portion and engaging with the plurality of engaging media, wherein the second connection portion is engaged with the first connection portion.

19. The stackable docking station according to claim 18, wherein the second stack layer has a USB-C port for a direct connection of the second stack layer to an electronic device when being used separately from the first stack layer.

20. The stackable docking station according to claim 18, wherein the second stack layer includes at least one of a DisplayPort, a network camera, a speaker, an electric fan, an air purifier, a table lamp, an uninterruptible power system and a storage table.

* * * * *